United States Patent
Camhi et al.

(10) Patent No.: US 12,060,070 B2
(45) Date of Patent: Aug. 13, 2024

(54) USING FEEDBACK FOR MENTAL MODELING OF VEHICLE SURROUNDINGS

(71) Applicant: TOYOTA RESEARCH INSTITUTE, INC., Los Altos, CA (US)

(72) Inventors: Jaime S. Camhi, Los Gatos, CA (US); Manuel Ludwig Kuehner, Mountain View, CA (US); Hiroshi Yasuda, San Francisco, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 17/728,104

(22) Filed: Apr. 25, 2022

(65) Prior Publication Data
US 2023/0339490 A1   Oct. 26, 2023

(51) Int. Cl.
*B60W 50/10* (2012.01)
*B60W 30/09* (2012.01)
*B60W 30/18* (2012.01)

(52) U.S. Cl.
CPC ........... *B60W 50/10* (2013.01); *B60W 30/09* (2013.01); *B60W 30/18163* (2013.01); *B60W 2540/215* (2020.02); *B60W 2540/30* (2013.01); *B60W 2554/20* (2020.02); *B60W 2554/4023* (2020.02); *B60W 2554/4026* (2020.02); *B60W 2554/802* (2020.02)

(58) Field of Classification Search
None
See application file for complete search history.

(56) References Cited

U.S. PATENT DOCUMENTS

| | | | |
|---|---|---|---|
| 6,363,322 B1 * | 3/2002 | Millington | G01C 21/3629 701/428 |
| 8,514,101 B2 | 8/2013 | Mathieu | |
| 8,573,976 B2 * | 11/2013 | Lecointre | F16H 63/42 434/29 |
| 9,342,993 B1 * | 5/2016 | Fields | G09B 5/125 |
| 9,428,124 B2 * | 8/2016 | Bobbitt, III | B60W 50/16 |

(Continued)

FOREIGN PATENT DOCUMENTS

WO   2004068164 A2   8/2004

OTHER PUBLICATIONS

"Classical Conditioning," Wikipedia, Feb. 26, 2003, 22 pages (en.wikipedia.org/wiki/Classical_conditioning).

*Primary Examiner* — Jonathan M Dager
(74) *Attorney, Agent, or Firm* — SHEPPARD, MULLIN, RICHTER & HAMPTON LLP; Daniel N. Yannuzzi

(57) ABSTRACT

The disclosure generally relates to methods for assisting a driver of a vehicle that include monitoring the driver's actions, during a first portion of time that starts when the driver begins to engage in a surveillance type action and ends when the driver ends the surveillance type action, activating one or more feedback devices, when the driver engages in a surveillance type action, monitoring the driver's actions during a second portion of time that beings when the driver ends the surveillance type action, and ends when the driver begins the surveillance type action, and activating one or more feedback devices, during the second portion of time when the driver engages in a driving maneuver and fails to engage in the surveillance type action.

20 Claims, 7 Drawing Sheets

(56) References Cited

U.S. PATENT DOCUMENTS

| | | | |
|---|---|---|---|
| 9,827,904 B2* | 11/2017 | Modarres | B60Q 9/008 |
| 9,969,404 B2* | 5/2018 | McNew | B60W 40/09 |
| 10,037,711 B2* | 7/2018 | Chauncey | G07C 5/0816 |
| 10,204,460 B2* | 2/2019 | Hodges | H04L 43/16 |
| 10,255,824 B2* | 4/2019 | Pearlman | G06Q 40/06 |
| 10,311,749 B1* | 6/2019 | Kypri | G09B 19/162 |
| 10,442,443 B1 | 10/2019 | Li | |
| 10,462,281 B2 | 10/2019 | Anderson | |
| 10,706,300 B2* | 7/2020 | Yamaoka | G06F 3/017 |
| 10,853,674 B2* | 12/2020 | Yamaoka | G06V 20/56 |
| 10,882,398 B2* | 1/2021 | Cordell | G06V 20/597 |
| 10,902,742 B2* | 1/2021 | Ramachandra | B60W 50/14 |
| 10,974,734 B2* | 4/2021 | Hori | B60W 30/18 |
| 11,436,866 B2* | 9/2022 | Suk | G06V 40/19 |
| 11,780,458 B1* | 10/2023 | Hussain | G06V 40/18 340/576 |
| 2007/0027593 A1* | 2/2007 | Shah | B60W 50/00 702/33 |
| 2008/0064014 A1* | 3/2008 | Wojtczak | G09B 9/04 434/69 |
| 2008/0174451 A1* | 7/2008 | Harrington | G08B 21/06 340/905 |
| 2010/0209885 A1* | 8/2010 | Chin | G09B 19/167 434/66 |
| 2014/0148988 A1* | 5/2014 | Lathrop | B60W 30/182 701/1 |
| 2015/0210292 A1* | 7/2015 | George-Svahn | G06V 20/597 348/148 |
| 2015/0258996 A1* | 9/2015 | Victor | B60W 40/09 340/576 |
| 2015/0262484 A1* | 9/2015 | Victor | G09B 9/04 701/1 |
| 2015/0379880 A1 | 12/2015 | Sethi | |
| 2016/0133117 A1* | 5/2016 | Geller | A61B 5/746 340/457 |
| 2016/0298971 A1* | 10/2016 | Mughal | G09B 19/167 |
| 2017/0060234 A1* | 3/2017 | Sung | G06V 10/25 |
| 2018/0170375 A1* | 6/2018 | Jang | B60W 30/0956 |
| 2019/0318181 A1* | 10/2019 | Katz | G06F 3/012 |
| 2020/0324759 A1* | 10/2020 | Sakuma | G06V 20/597 |
| 2021/0107494 A1* | 4/2021 | Silver | B60Q 1/525 |
| 2023/0166743 A1* | 6/2023 | Heck | B60W 50/0097 |
| 2024/0057913 A1* | 2/2024 | Degrand | B60W 40/08 |

* cited by examiner

USING FEEDBACK FOR MENTAL MODELING OF VEHICLE SURROUNDINGS

TECHNICAL FIELD

The present disclosure relates generally to a system that initiates a driving task-related action from the operator of a vehicle to increase safety.

DESCRIPTION OF RELATED ART

Modern vehicles often include intelligence for supporting the operator with a driving task. In vehicle safety applications, this intelligence typically directly influences the vehicle dynamics by intervening to alter vehicle behavior (e.g., emergency braking). However, often times, intervening systems produce intervening control operations/actions based on detecting false positive cases where interventions are unnecessary or wrong, thereby incorrectly intervening in driving operations.

BRIEF SUMMARY OF THE DISCLOSURE

In accordance with some embodiments, a method of assisting a driver of a vehicle may include monitoring the driver's actions, during a first portion of time that starts when the driver begins to engage in a surveillance type action and ends when the driver ends the surveillance type action, activating one or more feedback devices, when the driver engages in a surveillance type action, monitoring the driver's actions during a second portion of time that begins when the driver ends the surveillance type action, and ends when the driver beings the surveillance type action, and activating one or more feedback devices, during the second portion of time, when the driver engages in a driving maneuver and fails to engage in the surveillance type action.

In one embodiment, the method includes monitoring the drivers action's, during a first portion of time that starts when the driver begins to engage in a surveillance type action and ends when the driver ends the surveillance type action, activating one or more feedback devices when the driver engages in a surveillance type action, monitoring the driver's actions, during a second portion of time that starts when the driver ends the surveillance type action, and ends when the driver begins a surveillance type action, and activating one or more feedback devices, during a second portion of time, when the driver begins a driving maneuver and fails to conduct the surveillance type action.

In one embodiment, a driver assistance system includes a suggestion system configured to condition the driver to perform one or more driving maneuvers by monitoring the driver's action, during a first portion of time that starts when the driver begins to engage in a surveillance type action and ends when the driver ends the surveillance type action, activating one or more feedback devices, when the driver engages in the surveillance type action, monitoring the driver's actions, during a second portion of time that starts when the driver ends the surveillance type action, and ends when the driver begins the surveillance type action, and activating one or more feedback devices, during the second portion of time when the driver begins a driving maneuver and fails to engage in the surveillance type action.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
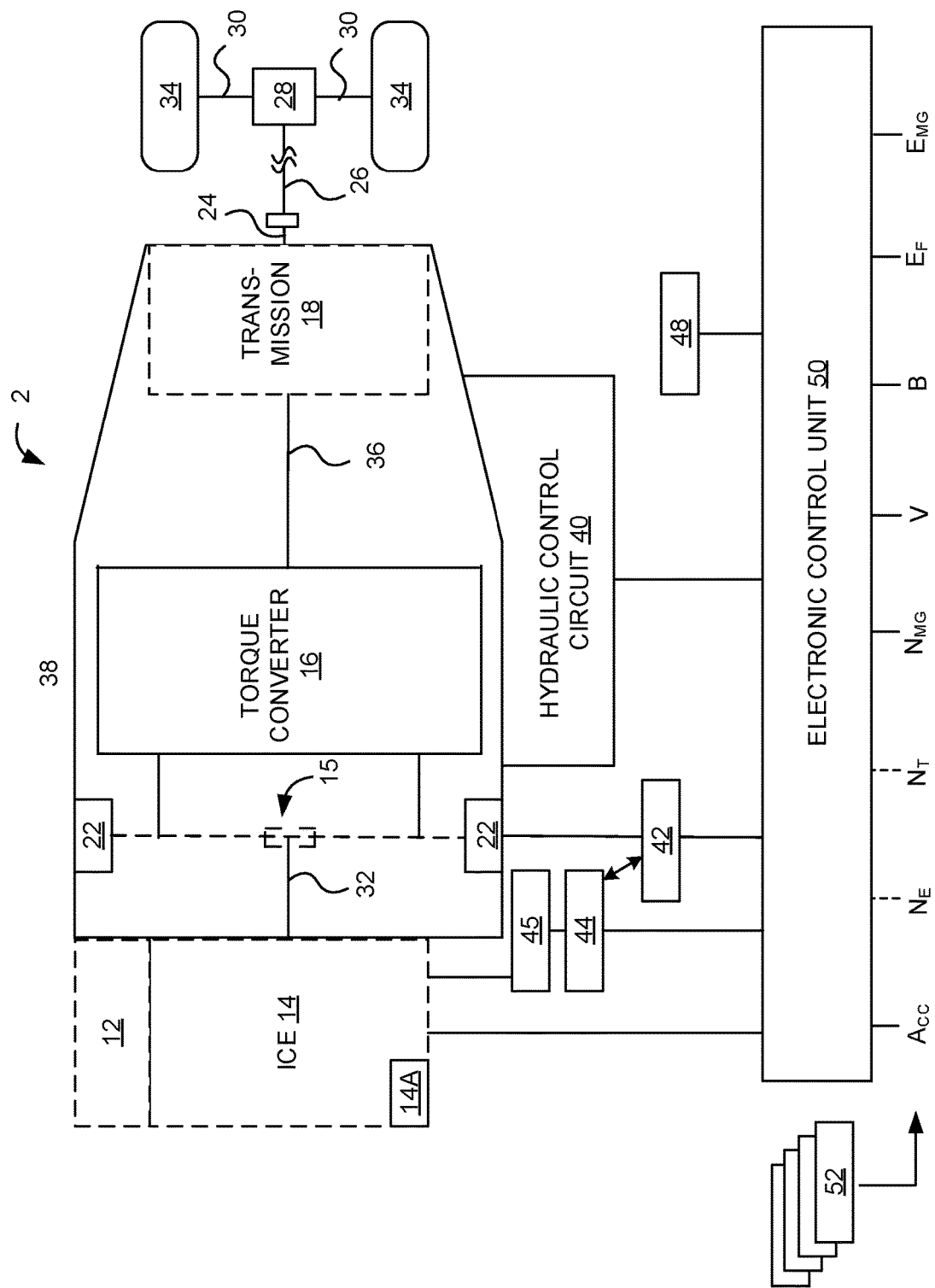
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Modern vehicles include many safety systems that directly influence vehicle dynamics. Safety systems that directly influence vehicle dynamics are commonly known as intervening systems since they interrupt the intended vehicle behavior by applying one or more safety features. For example, lane assist systems commonly apply a resistance, sometimes in the form of torque, to the steering wheel to prevent lane departure. By applying a resistance to the steering wheel, the lane assist systems "intervene" to prevent the driver from easily rotating the steering wheel to change lanes. However, often-times, intervening systems return false positive cases where interventions are unnecessary or wrong. Thus, instead of an system that intervenes, there is a need for a system that suggests to the driver, a driving action, which the driver can decide to follow or ignore. By suggesting a specific driving action to the driver, vis-à-vis a suggestion system, a recommended driving action can be presented to the driver without directly/actually performing or applying an intervening action.

During normal driving conditions (e.g., when the driver engages in a surveillance type action while operating the vehicle), the suggestion system conditions the driver to associate an HMI feedback mechanism with a specific driving action. For example, when a driver looks at his/or her driver's side mirror before merging lanes, one or more HMI feedback mechanisms are activated. Activating the one or more feedback mechanisms results in feedback being generated and presented to the driver vis-à-vis the feedback mechanism. As the driver repeats the specific driving action, and the one or more HMI feedback mechanisms are activated, the suggestion system begins to condition the driver to associate the HMI feedback mechanism with the specific driving action. In some embodiments, conditioning can refer to training the driver to associate a driving action (e.g., maneuver) with a particular instance of a type of HMI feedback.

As the driver is exposed to repeated cycles of conditioning, the cause-and-effect between the one or more HMI feedback mechanism, and the specific driving action is reversed so that when the suggestion system activates an HMI feedback mechanism in an non-training period the driver will associate the HMI feedback mechanism with a specific driving action. Thus the suggestion system conditions the driver to associate a specific driving action with one or more HMI feedback mechanism.

The suggestion system monitors the environment surrounding the vehicle. The environment typically includes one or more moving and/or non-moving objects with a first distance of the vehicle. By monitoring the environment surrounding the vehicle, the suggestion system 600 can determine whether or not the driver should or should not engage in a specific driving action. For example, if the vehicle safety system determines that a moving object is in a driving lane next to the vehicle, the safety system alerts the suggestion system 600 of the hazard. By monitoring the driver specific driving actions, the suggestion system 600 can determine whether or not the driver has engaged in an action necessary to avoid the hazard. For example, the suggestion system 600 determines that the driver has viewed each mirror and slowed down. However, if the suggestion system 600 determines that the driver has not engaged in a specific driving action necessary to avoid the hazard, the suggestion system activates one or more HMI feedback mechanism associated with the specific driving action to alert the driver of the hazard.

Examples of HMI feedback mechanism include acoustic feedback, haptic feedback and optical feedback associated with a driver engaging with features of the vehicle. For example, when the driver presses a mechanical pushbutton and feels and hears a click and a LED on the pushbutton gets activated or when a driver operates the turn signal lever and feels and the hears the mechanical notch, and the car generates an artificial (electro-mechanical) relay sound, and an arrow-shaped LED in the instrument cluster begins blinking.

Each specific driving action in which the driver engages is captured by one or first more sensors. Captured data associated with the driver's actions by the one or more first sensors is stored in memory. In addition, the environment surrounding the vehicle at the time when the driver engages in a specific driving action is captured by one or more second sensors. Captured data associated with the environment surrounding the vehicle is stored in the memory. By accessing the memory, the suggestion system 600 is able to associate a specific driving action with an environment surrounding the vehicle at the time of the specific driving action. By continuously monitoring the environment surrounding the vehicle, the suggestion system 600 is able to compare a specific driver's action with an external environment surrounding the vehicle.

In one embodiment, the HMI feedback occurs every time the driver does not engage in a surveillance type action before engaging in a driving maneuver (e.g., changing lanes), regardless of whether or not there is a moving or non-moving object within a distance of the vehicle, thereby conditioning (i.e., training) the driver to engage in a surveillance type action. In this embodiment, a driver's action or in-action can be used as the trigger instead of an external trigger (e.g., an object within a distance of the vehicle). For example, when the driver engages in a driving maneuver (e.g., changing lanes, actuating a turn signal, rotating a steering wheel, etc.) and engages in a surveillance type action, the system activates an HMI feedback. Over repeated instances of engaging in a driving maneuver, engaging in a surveillance type action, and observing (consciously or sub-consciously) the HMI feedback, the system will condition the driver to engage in a surveillance type action when the HMI feedback mechanism is activated. Thus, if the driver engages in a driving maneuver (e.g., changes lanes, actuates the turn signal, or rotates the steering wheel, etc.) and does not engage in a surveillance type action, then the system will activate the HMI feedback mechanism. In one embodiment, the driving maneuvers include driver initiated driving maneuvers such as actuating a turn signal, or rotating the steering wheel. However, the driving maneuvers can include other driving maneuvers typically associated with moving vehicles such as lane changes, and braking.

The systems and methods disclosed herein may be implemented with any of a number of different vehicles and vehicle types. For example, the systems and methods disclosed herein may be used with automobiles, trucks, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for an intelligent heads up display can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, NE, of internal combustion engine 14 (engine RPM), a rotational speed, $N_{MG}$, of the motor 22 (motor rotational speed), and vehicle speed, $N_V$. These may also include torque converter 16 output, NT (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc. Sensors 52 may also include camera, LIDAR, and other sensor types configured to detected environmental conditions external to a vehicle. For instance, camera sensors may be configured to detected an obstacle in the path of the vehicle.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

FIG. 1 is provided for illustration purposes only as an example of a vehicle system with which embodiments of the disclosed technology may be implemented. One of ordinary skill in the art reading this description will understand how the disclosed embodiments can be implemented with vehicle platforms.

Figure 2:
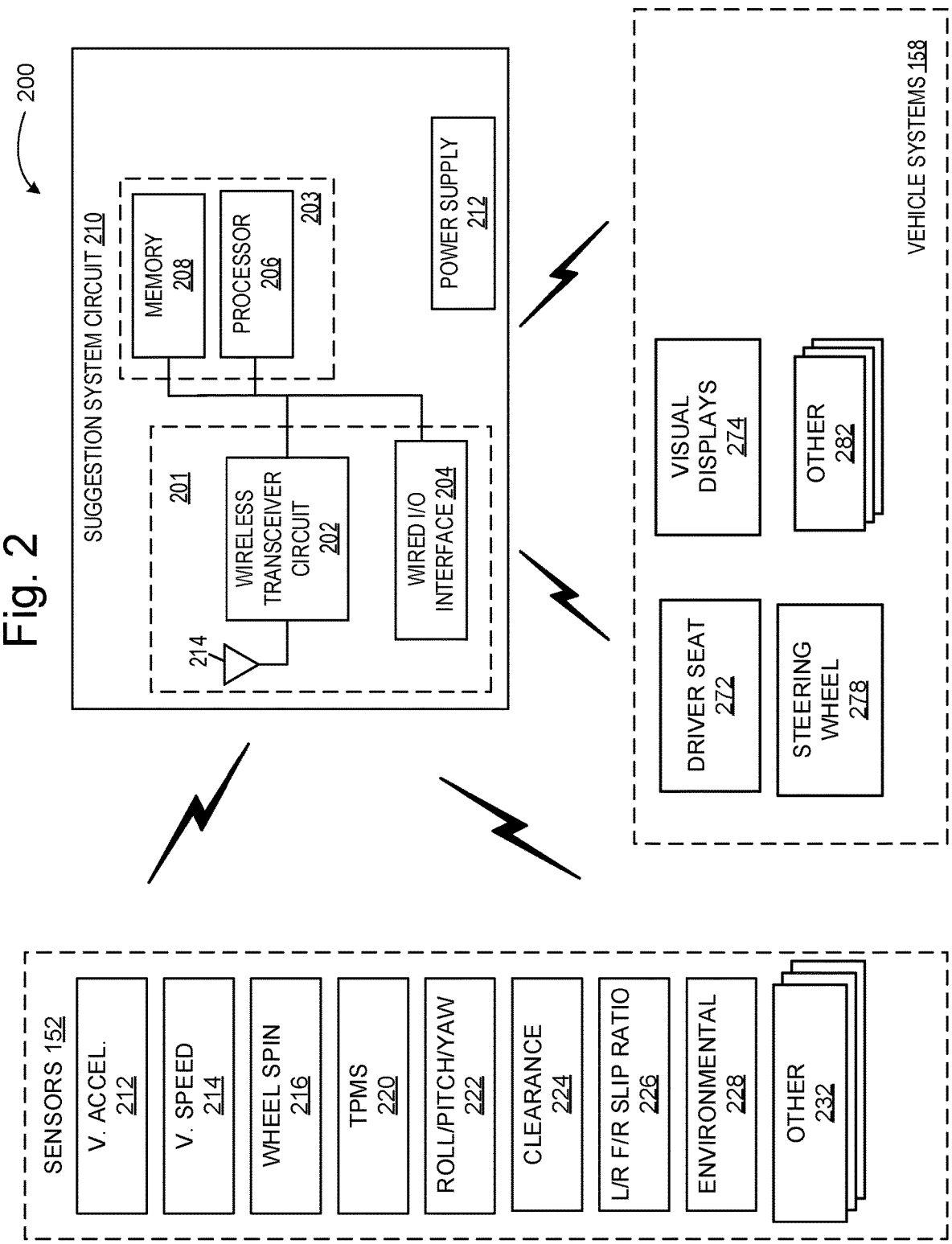
FIG. 2 illustrates an example architecture for detecting conditions associated with the suggestion system in accordance with one embodiment of the systems and methods described herein.

FIG. 2 illustrates an example architecture for the suggestion system 200 in accordance with one embodiment of the systems and methods described herein. Referring now to FIG. 2, in this example, the suggestion system 200 includes a suggestion system circuit 210, a plurality of sensors 152, and a plurality of vehicle systems 158. Sensors 152 and vehicle systems 158 communicate with the suggestion system circuit 210 via either a wired or wireless communication interface. Although sensors 152 and vehicle systems 158 are depicted as communicating with the suggestion system circuit 210, they can also communicate with each other as well as with other vehicle systems. In one embodiment, the suggestion system circuit 210 can be implemented as an ECU or as part of an ECU such as, for example electronic control unit 50. In another embodiment, the suggestion system circuit 210 can be implemented independently of the ECU.

The suggestions system circuit 210 in this example includes a communication circuit 201, a decision circuit (including a processor 206 and memory 208 in this example) and a power supply 212. Components of the suggestion system circuit 210 are illustrated as communicating with each other via a data bus, although other communication interfaces can be included. The suggestion system circuit 210 in this example also includes a manual assist switch 205 that can be operated by the user to manually select the assist mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to the suggestion system circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the suggestion system circuit 210.

Communication circuit 201 either or both a wireless transceiver circuit 202 with an associated antenna 214 and a wired I/O interface 204 with an associated hardwired data port (not illustrated). As this example illustrates, communications with the suggestion system circuit 210 can include either or both wired and wireless communications circuits 201. Wireless transceiver circuit 202 can include a transmitter and a receiver (not shown) to allow wireless communications via any of a number of communication protocols such as, for example, Wifi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by intelligent HUD activation/deactivation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

In one embodiment, sensors 152 include, sensors 52 as described above with reference to the example of FIG. 1. Sensors 52 can include additional sensors that may or not otherwise be included on a standard vehicle 10 with which the suggestion system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of the suggestion system 200. For example, sensors 152 may also include sonar, lidar, and/or camera sensors configured to detected external vehicle conditions, such as, for example, an obstacle in the presence of the vehicle.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, the suggestion system circuit 210 receives information from various vehicle sensors to determine whether the suggestion system 200 should be activated. Communication circuit 201 can be used to transmit and receive information between the suggestion system circuit 210 and sensors 152, and the suggestion system circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the suggestion system 200. Additionally, communication circuit 201 can be used to send an activation signal or other activation information to various vehicle systems 158 as part of activating the suggestion system 200. For example, as described in more detail below, communication circuit 201 can be used to send signals to, for example, one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 3:
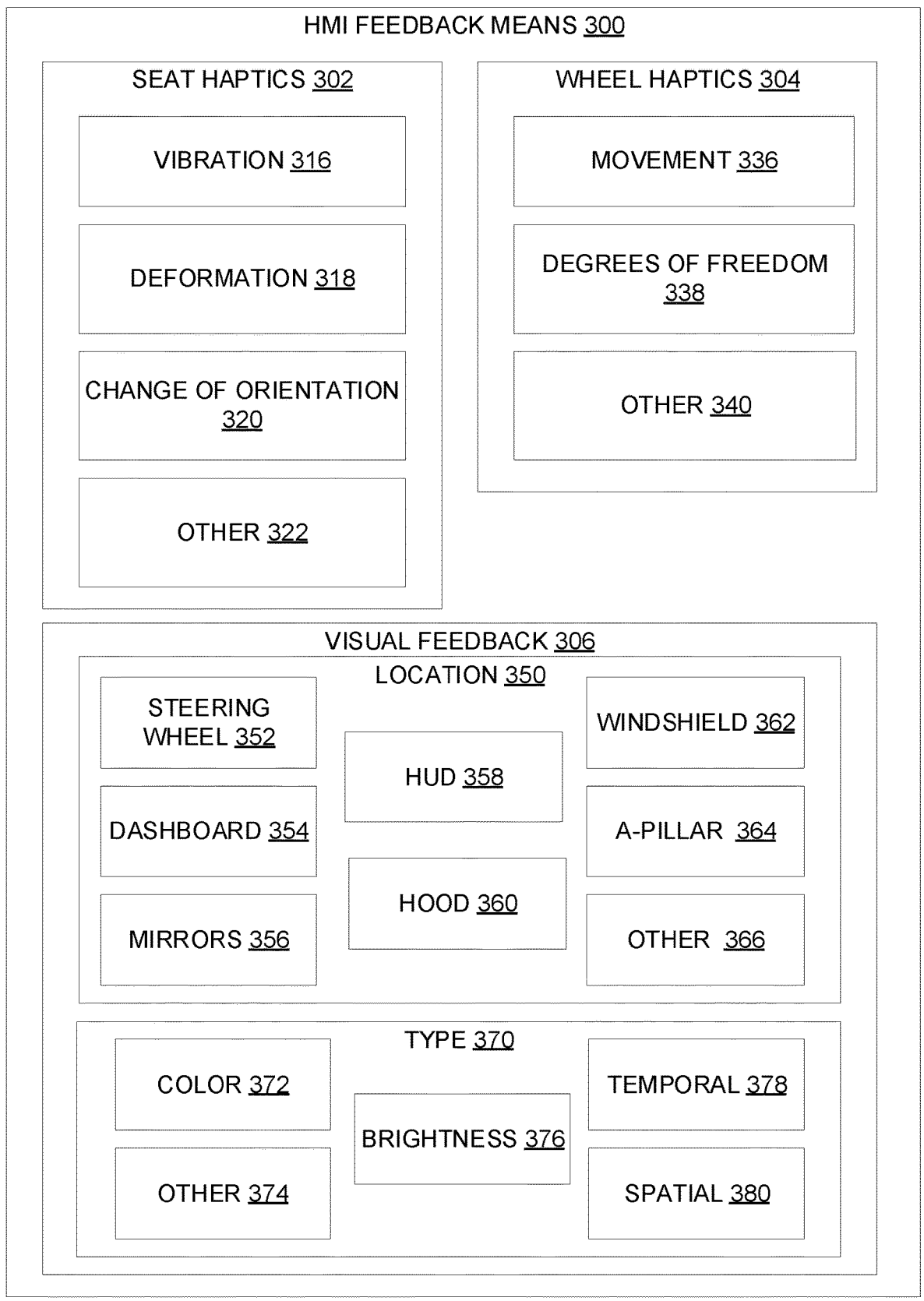
FIG. 3 is a diagram showing an example of various HMI feedback mechanism.

FIG. 3 is a diagram showing an example of various mechanisms of HMI feedback 300. In this embodiment, the HMI feedback includes seat haptics 302, wheel haptics 304 and visual haptics 306. The seat haptics 302 include vibration 30, deformation 318, change of orientation 320, and other seat haptics 322. Wheel haptics 304 include movement 336, degrees of freedom 338, and other wheel haptics 340. Visual haptics 306 include various types 370 and locations 350. The location 350 of the visual haptics 306 includes the steering wheel 352, the dashboard 354, mirrors 356, heads up display (HUD) 358, hood 360, windshield 362, A-pillar 364, and other locations 366. The type 370 of visual haptics include color 372, brightness 376, temporal 378, spatial 380, and other types 374.

Once the suggestion system 200 determines that the driver has failed to engage in a specific driving action (e.g., checking the mirrors, or looking over his/her shoulder), the suggestion/recommends to the driver a specific driving action using the one or more MHI feedback mechanisms. For example, in one embodiment, the system provides tactile feedback through the seat to suggestion to the driver to monitoring the mirrors of the vehicle before engaging in a driving maneuver. As previously mentioned, in this embodiment, the driver would have been previously conditioned to correlate the tactile feedback through the seat with checking the mirrors. During the training period, the suggestion system would have activated the tactile feedback through the seat, each time the driver checked one or more vehicle mirrors. Thus, when the suggestion system 200 is activated outside of the training mode, the driver is already conditioned to associate the tactile feedback with a specific driving action (i.e., checking the mirrors). Furthermore, in another embodiment, the suggestion system 200 provides tactile feedback through the seat to condition the driver to look over his/or her shoulder when changing lanes. Unlike the previous example, here, the suggestion system 200 activates tactile feedback through the seat when the driver does not engage in looking over his/her shoulder.

In one embodiment, the HMI feedback mechanism 300 includes seat haptics 302. Here, the driver can be trained, during the training period, by the vibration 316 of the seat, the deformation 318 of the seat, and/or some change in the orientation 320 of the seat. For example, when the driver is looking over his/her shoulder, the seat deforms, thus conditioning the driver to associate looking over his/her should when the seat deforms. In another example, when the driver is checking the mirrors, the seat vibrates, thus conditioning the driver to associate looking over his/her should when the seat deforms. In one embodiment, the driver can be trained using more than one seat haptic at a time. For example, a driver can be conditioned using the deformation of the seat and the vibration of the seat.

In another embodiment, the HMI feedback mechanism 300 includes wheel haptics 304. Here, the driver can be trained (i.e., conditioned) during the training period, by the movement 336 of the wheel, and/or degrees of freedom of the wheel 304. In one embodiment, the degrees of freedom of the wheel 304 include a resistance in the wheel when a driver is engaging in a specific driving task. For example, in some lane assist driver tools, a lane assist tool will increase the resistance of the steering wheel preventing the driver from turning the wheel in a typical fashion, thus alerting the driver to a specific event. In one embodiment, the driver can be trained using more than one wheel haptic at the same time. For example, a driver can be trained (i.e., conditioned) using the movement 336 of the wheel and the restricting the degrees of freedom 338 of the wheel.

In another embodiment, the HMI feedback mechanism 300 includes visual feedback 306. Here, the driver can be trained (i.e., conditioned) during the training period, by visual feedback 306. The visual feedback 306 can be located one or more locations within view of the driver. The locations include any location on the steering wheel 352, the dashboard 354 (e.g., instrument cluster, or navigation cluster), any mirrors in the vehicle 356, a heads-up-display 358, the hood 360, the windshield 362, and/or the A-pillar 364. The visual feedback 306 can be varied by color 372, brightness 376, and temporal 378 and spatial 380 means. For example, in one embodiment, the visual feedback 306 includes a pulse of light (e.g., led) that is red, and located on the steering wheel, the engages when the driver is engaging in a specific driving task. For example, when the driver is looking over his/her shoulder, a red pulse of light on the dashboard activates, thus conditioning the driver to associate looking over his/her should when the red pulse of light on the dashboard activates. In another example, when the driver is checking the mirrors, a green pulse of light activates on the heads-up display (HUD), thus conditioning the driver to associate looking over his/her should with the green pulse of light on the heads-up display. In some embodiments, a specific brightness of visual HMI feedback may be distracting to a driver. Thus, it may be necessary to adjust the brightness and color of the visual feedback to capture the driver's attention (to train the driver).

In one embodiment, the driver can be trained (i.e., conditioned) using more than one visual feedback 306 at the same time. For example, a driver can be trained (i.e., conditioned) using a pulse of light on the A-pillar 364 and the dashboard 354.

Figure 4:
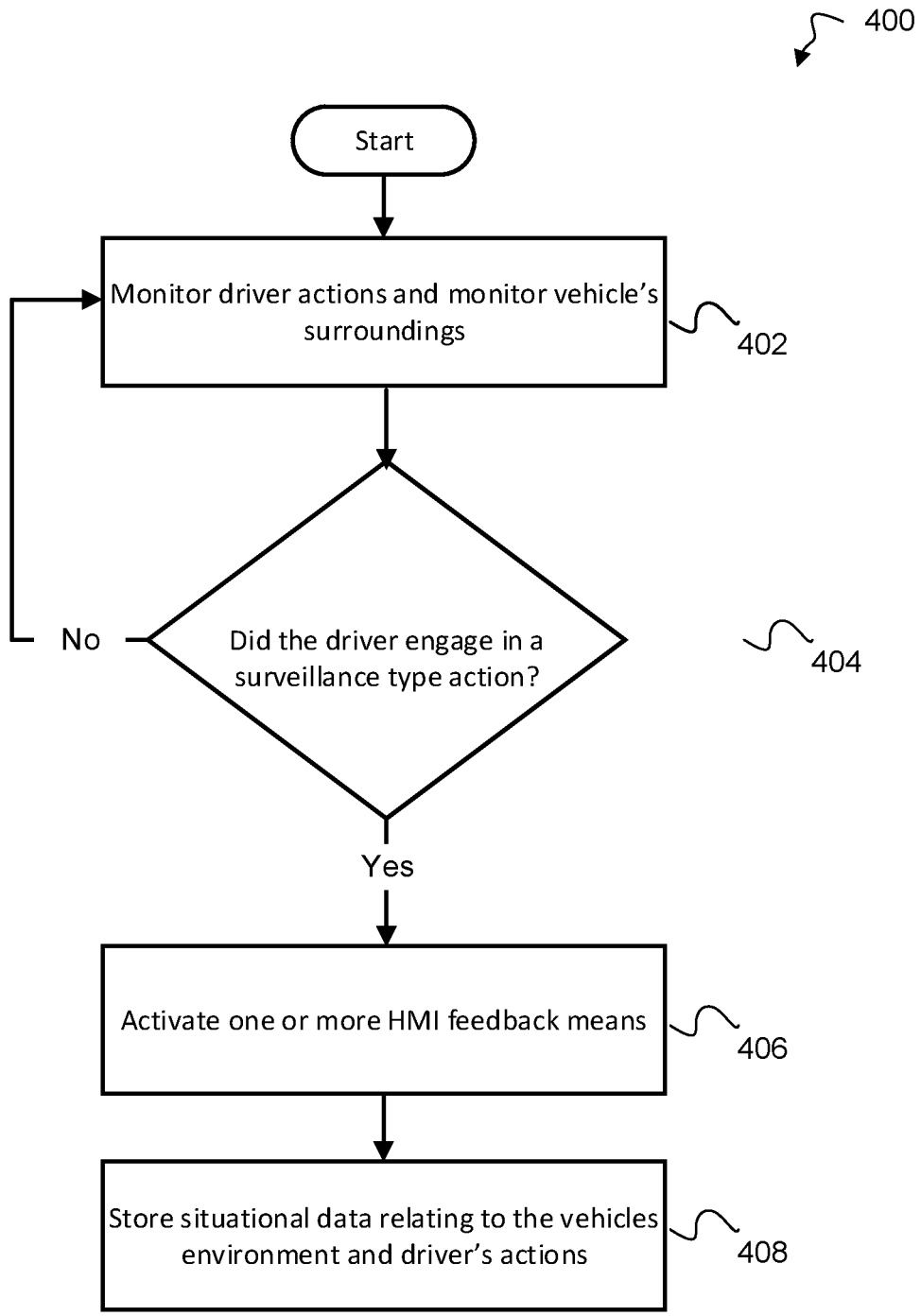
FIG. 4 is a flow diagram of a method for training the suggestion system, according to one embodiment.

FIG. 4 is a flow diagram showing an example of a method 400 for training the suggestion system 200, according to one embodiment. The method includes monitoring the driver's actions and monitoring the vehicle surroundings, activating one or more HMI feedback mechanism if the driver engages in a surveillance action, and storing situational data relating to the vehicle's environment (e.g., surroundings) and the driver's actions at the time when the HMI feedback was engaged.

At activity 402, the method 400 includes monitoring driver and vehicle surroundings. In one embodiment, the suggestion system 200 uses data received from one or more sensors 152 to monitor both the driver and the environment surrounding the vehicle. Here, the one or more sensors 152 monitor the vehicle's surroundings and capture data regarding the environment surrounding the vehicle (e.g., the driving environment), and the driver's actions. The captured data is sent by the one or more sensors 152 to the suggestion system 210. The captured data is received by the suggestion system 210 and processed according to activity 404. The received data includes video and image data. The sensors include cameras, and other sensors that can monitor human actions, such as infrared sensors. The environment surrounding the vehicle includes an internal and external environment. For example, monitoring the internal environment includes monitoring sensors within the vehicle, such as the sensors included in the discussion of FIG. 1 and FIG. 2. In one embodiment, a sensor monitors the driver's face and upper body. In one embodiment, monitoring an external environment includes monitoring other vehicles surrounding the vehicle, the location of the vehicle in relation to the road, and/or the location of the vehicle in relation to hazards near the road (such as a trash can, or pedestrian).

At activity 404, the method 400 include determining whether the driver engaged in a surveillance type action. Here, the captured data is received by the suggestion system circuit 210, and processed by the processor 206 of the suggestion system circuit 210 to determine whether the suggestion system 200 should suggest an action to the driver. In one embodiment, the processor 206 uses captured data that includes the driver's face and upper body to determine whether the driver looked at the mirror. The mirror includes one or more inside mirrors and/or one or more outside mirrors. For example, vehicles in which the suggestion system is applied typically include two side mirrors, one on the driver's side and one on the passenger side, and a rear view mirror. In another embodiment, the processor 206 uses captured data that includes the driver's face and upper body to determine whether the driver looked over his/her shoulder.

At activity 406, the method 400 includes activating one or more HMI feedback mechanism 300. Once the processor 206 determines that the driver engaged in a surveillance type action, the processor 206 activates one or more HMI feedback mechanisms 300. In one embodiment, the processors 206 sends instructions to the vehicle system 158 to activate one or more HMI feedback mechanisms 300. By activating the one or more HMI feedback mechanisms 300, the suggestions system 200 conditions the driver to associate a unique feedback with a driving action. For example, each time the suggestion system 200 displays a unique feedback the driver will consciously or subconsciously begin to associate the feedback with the action. After repeatedly activating the one or more HMI feedback mechanisms, the suggestion system 200 will condition the driver to associate a specific feedback with a unique driving action.

In one embodiment, the HMI feedback occurs every time the driver does not check one or more mirrors before engaging in a driving maneuver (e.g., changing lanes), regardless of whether or not there is a moving or non-moving object within a distance of the vehicle, thereby training the driver to check the one or more mirrors before beginning the driving maneuver. In this embodiment, a driver's action of engaging in a driving maneuver, as evidenced by interacting with one or more vehicle driving elements (e.g., actuating a turn signal, rotating a steering wheel), and failing to engage in a surveillance type action (e.g., checking the mirrors) will activate the HMI feedback mechanism. For example, the driver may engage in a driving maneuver by rotating the steering wheel or actuating the turn signal, which triggers an HMI feedback mechanism when the driver checks the mirrors during the driving maneuver. Over many repeated instances of activating the HMI feedback mechanism when the driver engages in the driving maneuver and checks the mirrors, the system will condition the driver to check the one or more mirrors of the vehicle. If the driver rotates the steering wheel or actuate a turn signal to engage in a driving maneuver, and does not check the mirrors, then the HMI feedback mechanism will activate an HMI feedback.

In another embodiment, the HMI feedback occurs every time the driver does look over the shoulder before engaging in a driving maneuver (e.g., changing lanes), regardless of whether or not there is a moving or non-moving object within a distance of the vehicle, thereby training the driver to look over the shoulder before beginning the driving maneuver. In this embodiment, a driver's action of engaging in a driving maneuver, as evidenced by engaging with one or more vehicle elements (e.g., actuating a turn signal, moving a steering wheel), and failing to engage in the surveillance type action (e.g., looking over the shoulder), will activate the HMI feedback mechanism. For example, the driver may engage in a driving maneuver by rotating the steering wheel or actuating a turn signal, which activates an HMI feedback mechanism when the driver looks over his or her shoulder. After many repeated instances of engaging in the driving maneuver and observing the HMI feedback, the system will condition the driver to look over his/her shoulder of the vehicle. If the driver rotates the steering wheel or actuates the turn signal and does not look over his or her shoulder, then the HMI feedback mechanism will activate an HMI feedback.

In one embodiment, the HMI feedback mechanism 300 include seat haptics. The seat haptics 302 include vibration 316 of the seat, deformation 318 of the seat, and change of orientation 320 of the seat. In another embodiment, the HMI feedback mechanism 300 include wheel haptics 304. The wheel haptics 304 include movement 336 of the wheel, and altering the degrees of freedom of the wheel 338. In another embodiment, the HMI feedback mechanism 300 includes visual feedback 306. The visual feedback 306 is applied to multiple locations 350 that include the steering wheel 352, the dashboard 354, the mirrors 356, the heads up display (HUD) 358, the hood 360, windshield 362, and A-pillar 364. Furthermore, the visual feedback 306 includes different types 370 of feedback. The different types 370 of visual feedback include color 372, brightness 376, temporal 378, and spatial 380.

At activity 408, the method 400 includes storing situational data relating to the vehicle's environment and the driver's actions at the time of activating the one or more HMI feedback mechanisms. In one embodiment, the data captured by the one or more sensors 152, that includes the vehicle's environment and the driver's actions, is stored as situational data in the memory 208 of the suggestion system circuit 210. As explained further in in FIG. 5, the situational data is used by the processor 206 to determine one or more environmental conditions and driver actions exist. In one embodiment, the data is stored in a remote location (for example, on a server). In another embodiment, the data is stored within the vehicle. The data is used by the suggestion system 200 to determine whether the suggestion system 200 should be activated to suggestion a specific driving action to the driver. As further explained in FIG. 5 below, the suggestion system 200 captures data during a training period to determine whether one or more elements driving elements are present, and thus require activation of the suggestion system 200.

Figure 5:
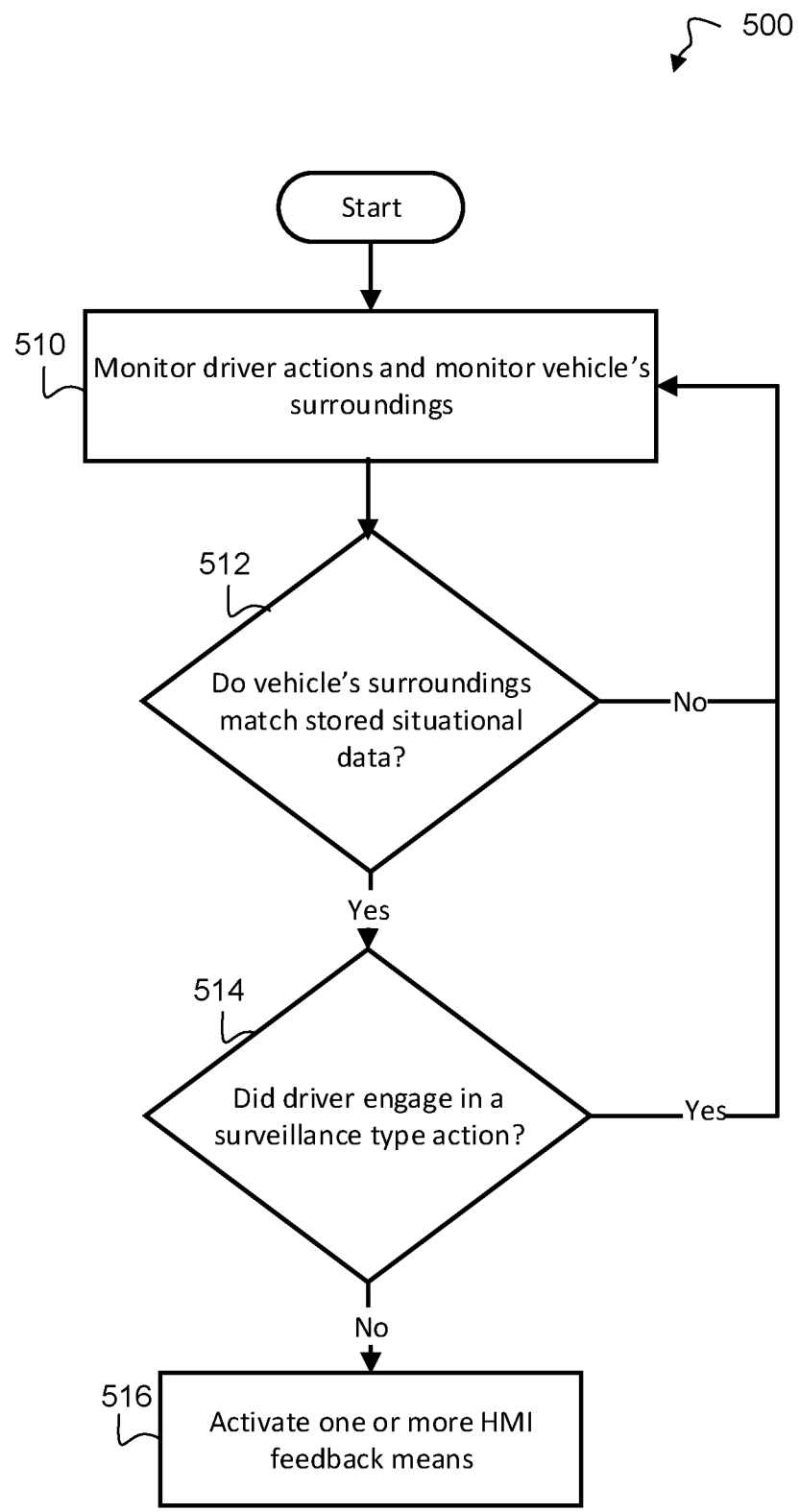
FIG. 5 is a flow diagram of a method for operating the suggestion system according to one embodiment.

FIG. 5 is a flow diagram showing an example of a method 500 for implementing suggestion system during a non-training period, according to one embodiment. The method 500 includes monitoring the driver actions and monitoring the vehicle's surroundings, and activating the one or more HMI feedback mechanism 300 if the vehicle's surroundings are substantially similar (e.g., match) the stored situational data, and if the driver did not engage in a surveillance type action. For example, by comparing the vehicle's previous environment on previous lane changes, and actively monitoring the current vehicle's environment, the suggestion system 200 is able to determine whether or not the driver should engage in a specific driving action. If the suggestion system 200 determines that the driver should engage in a specific action, and failed to do so, it can activate a HMI feedback mechanism to suggest to the driver to engage in an action.

At activity 510, the method 500 includes monitoring the driver actions and monitoring the vehicle's surroundings. As previously mentioned at activity 402 in method 400, the suggestion system 200 uses data captured from one or more sensors to monitor both the driver and environment surrounding the vehicle. In one embodiment, the one or more sensors 152 monitor the vehicle's surroundings and capture data regarding the environment surrounding the vehicle (e.g., the driving environment), and the driver's actions. The captured data is sent by the one or more sensors 152 to the suggestion system 210. The capture data is received by the suggestion system 210 and processed according to activity 404. The captured data includes video and image data. The sensors include cameras, and other sensors that can human actions, such as infrared sensors. The suggestion system 400 also monitors the environment surrounding the vehicle. The environment surrounding the vehicle includes an internal and external environment. As explained in further detail below, captured data relating to the driver's specific action and the environment surrounding the vehicle at the time of the action is stored and continuously referenced to determine whether or not the suggestion system 200 should be activated. For example, in one embodiment, data captured during a training period of the driver's specific driving action and the environment around the vehicle is stored and referenced by the suggestion system during a non-training period to determine whether or not the vehicle is in an environment in which the driver should or should not have engage in a previous driving action.

At activity 512, the method 500 includes determining whether the vehicle's surroundings match the stored situational data relating to the vehicles environment. In one embodiment, captured data that includes the environment surrounding the vehicle is received by the suggestion system circuit 210, and processed by the processor 206 of the suggestion system circuit 210 to determine whether the current environment is substantially similar to the environment previously captured and stored in memory 208 as situational data. For example, data captured by the one or more sensors 152 regarding the environment surrounding the vehicle is sent to and received by the processor 206 in the suggestion system circuit 210. The processor 206 compares the captured data to the stored situational data to determine whether or not one or more parameters (e.g., elements) exist in both environments. For example, whether or not an object is in the blind spot of the vehicle. If the processor 206 determines that the captured data is substantially similar to the situational data, then the suggestion system 200 advances to activity 514 to determine whether the driver engaged in a surveillance type action.

By actively monitoring the vehicle's surroundings and the drivers actions, the suggestion system is able to continuously gather new environmental data relating to the driver's specific driving actions and the vehicle's environment. In one embodiment, this new environmental data is cross referenced to previously captured data (i.e., situational data) relating to the vehicle's environment to determine whether or not the vehicle is currently in a similar environment to an environment in the past. If the suggestion system 200 determines that the vehicle is in a similar environment (for example, one or more new objects surround the vehicle at a similar distance as one or more previously captured objects surrounded the vehicle), the suggestion system 200 then moves on to activity 514 to determine whether the driver is engaging in a surveillance type action.

At activity 514, the method 500 includes determining whether the driver engaged in a surveillance type action. In one embodiment, the captured data is received by the suggestion system circuit 210, and processed by the processor 206 of the suggestion system circuit 210 to determine whether the suggestion system 200 should suggest an action to the driver. In one embodiment, the processor 206 uses captured data that includes the driver's face and upper body to determine whether the driver looked at the mirror. In another embodiment, the processor 206 uses captured data that includes the driver's face and upper body to determine whether the driver looked over his/her shoulder.

Here, the captured data is compared with previously captured stored data (i.e., situational data) to determine whether or not the driver is engaging in a specific driving action that necessitates a suggestion or recommendation. In one embodiment, captured data that includes the driver's actions is received by the suggestion system circuit 210, and processed by the processor 206 of the suggestion system circuit 210 to determine whether the driver engaged in a surveillance type action. If the processor 206 determines that the driver engaged in a surveillance type action, the suggestion system 200 advances to activity 516 to activate one or more HMI feedback mechanisms.

As the driver engages in more and more specific driving actions, and as the suggestion system 200 stores more and more captured data, the suggestion system 200 can increase the effectiveness in which it is able to determine repeat situations, where the driver (in the past) had engaged in a specific driving action, yet (currently) failed to do so. For example, as the system captures data on 100 repeat lane changes, in which the driver has checked his/her mirrors, and/or looked over his/her shoulder, the suggestion system is able to create a library of specific driver actions related to lane changing.

In one embodiment, the processor 206 uses captured data that includes the driver's face and upper body to determine whether the driver looked over his/her shoulder. In another embodiment, the processors 206 uses captured data that includes the driver's face and upper body to determine whether the driver looked at the mirror. The mirror includes one or more inside mirrors and/or one or more outside mirrors. For example, vehicles in which the suggestion system is applied typically include two side mirrors, one on the driver's side and one on the passenger side, and a rear view mirror. In one embodiment, a sensor monitors the driver's face and upper body to determine whether the driver looked over his or her shoulder.

If the driver engages in a surveillance type action, then the suggestion system 200 continues to monitor the driver actions without progressing to activity 516. However, if the driver fails to engage in a surveillance type action, the suggestion system 200 progresses to activity 516, and activates one or more HMI feedback mechanism.

At activity 516, the method 500 includes activating one or more HMI feedback mechanism. Once the processor 206 determines that the vehicle's surrounding are substantially similar to the stored situational data, and that the driver failed to engage in a surveillance type action, the processor 206 activates one or more HMI feedback mechanisms 300. In one embodiment, the processors 206 sends instructions to the vehicle system 158 to activate one or more HMI feedback mechanisms 300. By activating the one or more HMI feedback mechanisms 300, the suggestion system 200 suggests to the driver engage in a driving action for which he/she was previously conditioned to associate a unique feedback mechanism with. For example, when the suggestion system 200 displays a unique feedback, the driver will consciously or subconsciously begin engage in the driving action associated with the HMI feedback. Since the HMI feedback is a suggestion, if the driver determines that the driving action is not needed, the driver can choose to ignore the suggestion.

As previously mentioned, the one or more HMI feedback mechanism 300 include seat haptics 302, wheel haptics 304 and visual feedback 306. The visual feedback 306. Each HMI feedback mechanism is associated with a specific driving action by the training procedure that previously conditioned the driver to associated the one or more HMI feedback mechanism with a specific driving action. Thus, when a driver fails to engage in a specific driving action and the suggestion system 200 determines that the driver should have engaged in a specific driving action, the suggestion system 200 suggestions and/or recommends to the driver the he/she engage in the specific driving action by activating the one or more HMI feedback mechanism.

Figure 6:
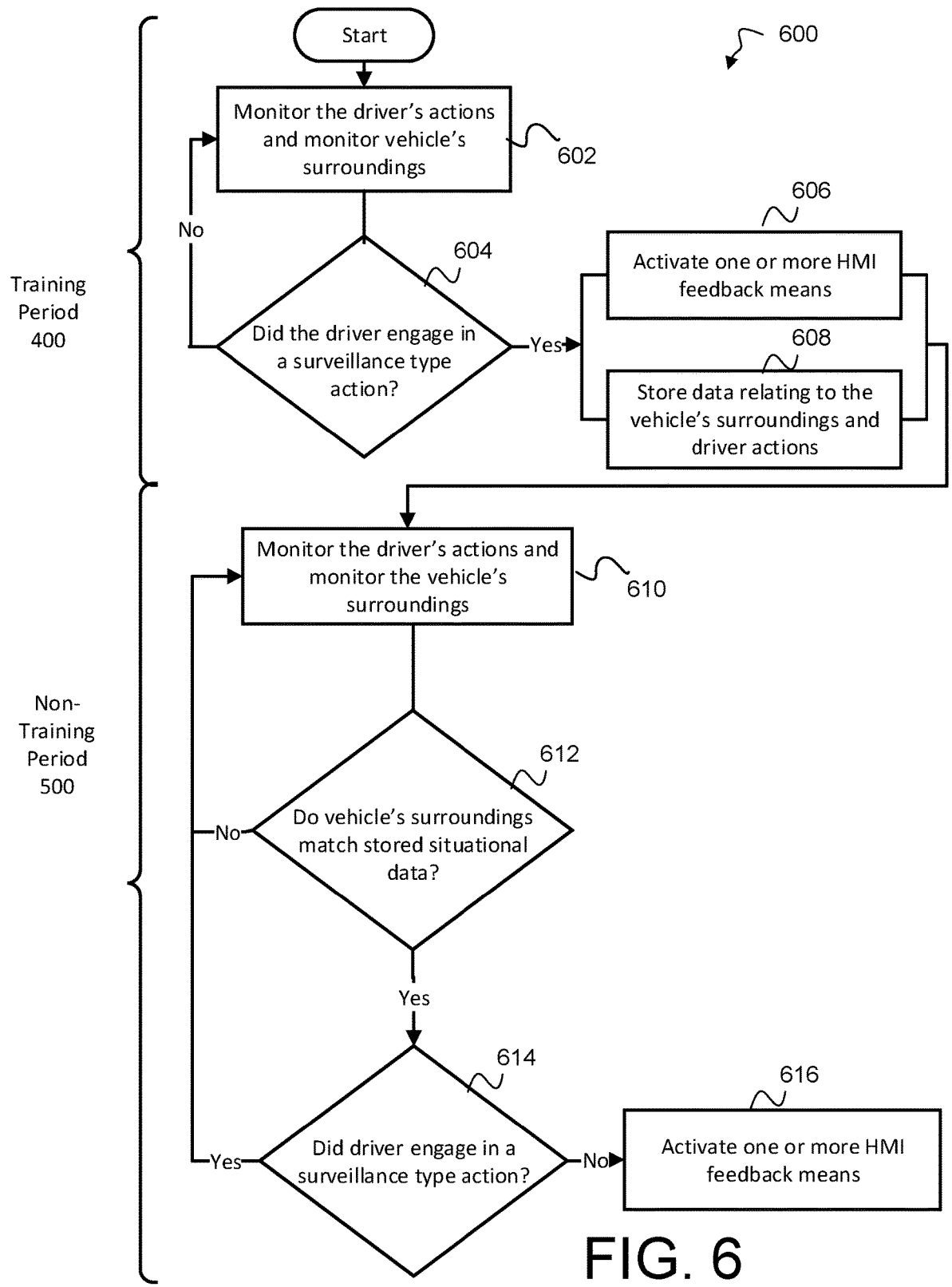
FIG. 6 is a flow diagram of a method for training and operating the system according to one embodiment.

FIG. 6 is a flow diagram showing an example of a method 600 of using the suggestion system 200, according to one embodiment. The method 600 includes the training period 400 that includes monitoring the driver actions and vehicle's surroundings, activating one or more HMI feedback mechanism and storing data relating to the vehicle's surroundings and driver's actions if the driver engaged in a surveillance type action. The method 600 further includes the non-training period 500 that includes monitoring the driver's actions and monitoring the vehicle's surroundings, and activating one or more HMI feedback mechanism if the vehicle's surroundings match the stored situational data and the driver engaged in a surveillance action.

At activity 602, the method 600 includes monitoring the driver's actions, and monitoring the vehicle's surroundings. At activity 604-608, the method 600 includes determining whether the driver engaged in a surveillance type action, and activating one or more HMI feedback mechanism, and storing data relating to the vehicles surroundings and driver's actions. At activity 610, the method includes continuing to monitor the driver's actions and monitor the vehicle's surroundings. At activity 612-616, the method includes determining whether the vehicle's surrounding match stored situational data, and whether the driver engaged in a surveillance type action. If the suggestion system 200 determines that the vehicle's surroundings match the stored situational data and that the driver did not engage in a surveillance type action, the suggestion system 200 activates the one or more HMI feedback mechanism.

It should be noted, that the suggestion system is not limited to any specific level of conditioning. The granularity by which the suggestion system conditions the driver includes both conscious and subconscious training. For example a driver may consciously or subconsciously take notice the one or more HMI feedback mechanism.

Figure 7:
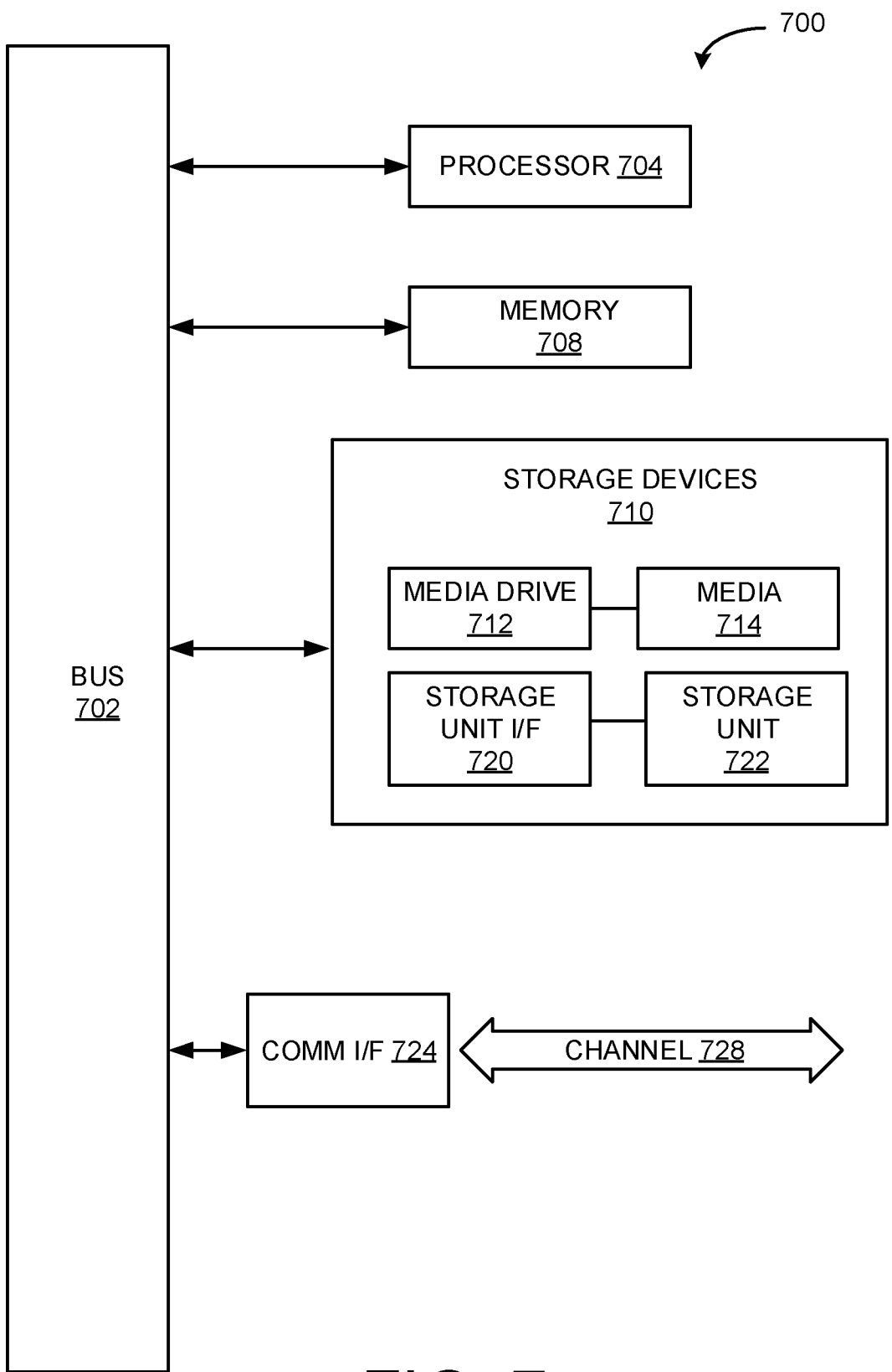
FIG. 7 is an example computing component that may be used to implement various features of embodiments described in the present disclosure.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up a user device, a user system, and a non-decrypting cloud service. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of assisting a driver of a vehicle comprising:
   monitoring actions of the driver, during a first portion of time that starts when the driver begins to engage in a surveillance type action and ends when the driver ends the surveillance type action;
   activating one or more feedback devices, when the driver engages in the surveillance type action;
   monitoring the actions of the driver during a second portion of time that begins when the driver ends the surveillance type action, and ends when the driver begins the surveillance type action; and
activating one or more feedback devices, during the second portion of time, when the driver engages in a driving maneuver and fails to engage in the surveillance type action.

2. The method of claim 1, wherein the actions of the driver are monitored during a training mode, wherein the training mode includes the first portion of time that starts when the driver begins to engage in the surveillance type action and ends when the driver ends the surveillance type action, and wherein the actions of the driver are monitored during a non-training mode, wherein the non-training mode includes the second portion of time that starts when the driver ends the surveillance type action, and ends when the driver begins the surveillance type action.

3. The method of claim 1, further comprising:
monitoring one or more moving objects within a first distance of the vehicle during a training mode;
capturing data of the one or more moving objects within the first distance of the vehicle during the training mode;
monitoring the actions of the driver and the one or more moving objects within a second distance of the vehicle, during a non-training mode; and
activating the one or more feedback devices, during the non-training mode, when the one or more moving objects within the second distance of the vehicle are about a same distance to the vehicle as the one or more moving objects within the first distance and the driver fails to engage in the surveillance type action.

4. The method of claim 1, wherein the surveillance type action includes the driver checking a mirror of the vehicle.

5. The method of claim 1, wherein the surveillance type action includes the driver looking over his or her shoulder to check a blind spot of the vehicle before changing lanes.

6. The method of claim 3, wherein the first distance and the second distance are about equal distance from the vehicle.

7. The method of claim 3, wherein the one or more moving objects include a non-moving object.

8. The method of claim 7, wherein the one or more objects are one or more other vehicles that include one or more motorcycles, bicycles, buses, trucks, and automobiles.

9. A method comprising:
monitoring actions of a driver of a vehicle, during a first portion of time that starts when the driver begins to engage in a surveillance type action and ends when the driver ends the surveillance type action;
activating one or more feedback devices when the driver engages in the surveillance type action;
monitoring the actions of the driver, during a second portion of time that starts when the driver ends the surveillance type action, and ends when the driver begins the surveillance type action; and
activating the one or more feedback devices, during the second portion of time, when the driver begins a driving maneuver and fails to conduct the surveillance type action.

10. The method of claim 9, wherein the actions of the driver are monitored during a training mode, wherein the training mode includes the first portion of time that starts when the driver begins to engage in the surveillance type action and ends when the driver ends the surveillance type action, and wherein the actions of the driver are monitored during a non-training mode, wherein the non-training mode includes the second portion of time that starts when the driver ends the surveillance type action, and ends when the driver begins the surveillance type action.

11. The method of claim 10, further comprising:
monitoring a first environment surrounding the vehicle, during the training mode;
capturing data, during the training mode, of the driver's surveillance type action and the first environment surrounding the vehicle;
monitoring the actions of the driver, and a second environment surrounding the vehicle, during the non-training mode; and
activating the one or more feedback devices, during the non-training mode, when the second environment surrounding the vehicle is substantially similar to the first environment surrounding the vehicle, and the driver fails to engage in the surveillance type action.

12. The method of claim 10, wherein the surveillance type action includes the driver checking a mirror of the vehicle.

13. The method of claim 10, wherein the surveillance type action includes the driver looking over his or her shoulder to check a blind spot of the vehicle before changing lanes.

14. The method of claim 11, wherein the first environment includes a first moving object a first distance from the vehicle and the second environment includes a second moving object a second distance from the vehicle.

15. The method of claim 14, wherein the first distance and the second distance are substantially similar.

16. A driver assistance system comprising:
a suggestion system configured to condition a driver of a vehicle to perform one or more driving maneuvers, by:
monitoring actions of the driver, during a first portion of time that starts when the driver begins to engage in a surveillance type action and ends when the driver ends the surveillance type action;
activating one or more feedback devices, when the driver engages in the surveillance type action;
monitoring the actions of the driver, during a second portion of time that starts when the driver ends the surveillance type action, and ends when the driver begins the surveillance type action; and
activating the one or more feedback devices, during the second portion of time when the driver begins a driving maneuver and fails to engage in the surveillance type action.

17. The system of claim 16, wherein the actions of the driver are monitored during a training mode, wherein the training mode includes the first portion of time that starts when the driver begins to engage in the surveillance type action and ends when the driver ends the surveillance type action, and wherein the actions of the driver are monitored during a non-training mode, wherein the non-training mode includes the second portion of time that starts when the driver ends the surveillance type action, and ends when the driver begins the surveillance type action.

18. The system of claim 17, further comprising:
one or more second sensors configured to capture data associated with an environment surrounding the vehicle;
monitor one or more moving objects within a first distance of the vehicle during the training mode;
capture data, during the training mode, of the driver's surveillance type action and the one or more moving objects within the first distance of the vehicle;
monitor the actions of the driver, and the one or more moving objects within a second distance of the vehicle, during the non-training mode; and activating the one or more feedback devices, during the non-training mode, when the one or more moving objects within the second distance of the vehicle are about a same distance to the vehicle as the one or more moving objects within the first distance, and the driver fails to engage in the surveillance type action.

19. The system of claim 16, wherein the surveillance type action includes the driver checking a mirror of the vehicle.

20. The system of claim 16, wherein the surveillance type action includes the driver looking over his or her shoulder to check a blind spot of the vehicle before changing lanes.

* * * * *